US012681943B2

(12) United States Patent
Wood et al.

(10) Patent No.: US 12,681,943 B2
(45) Date of Patent: Jul. 14, 2026

(54) ONLINE HYPERPARAMETER TUNING IN DISTRIBUTED MACHINE LEARNING

(71) Applicant: Microsoft Technology Licensing, LLC, Redmond, WA (US)

(72) Inventors: Ian B. Wood, Bloomington, IN (US); Xu Miao, Los Altos, CA (US); Chang-Ming Tsai, Fremont, CA (US); Joel D. Young, Milpitas, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1319 days.

(21) Appl. No.: 17/493,743

(22) Filed: Oct. 4, 2021

(65) Prior Publication Data

US 2022/0027359 A1 Jan. 27, 2022

Related U.S. Application Data

(63) Continuation of application No. 15/477,782, filed on Apr. 3, 2017, now abandoned.

(51) Int. Cl.
| | |
|---|---|
| *G06N 20/00* | (2019.01) |
| *G06F 15/76* | (2006.01) |
| *G06F 16/248* | (2019.01) |
| *G06N 3/006* | (2023.01) |
| *G06N 3/082* | (2023.01) |
| *G06N 5/01* | (2023.01) |
| *G06N 7/01* | (2023.01) |

(Continued)

(52) U.S. Cl.
CPC ............ *G06F 16/248* (2019.01); *G06F 15/76* (2013.01); *G06N 3/006* (2013.01); *G06N 3/082* (2013.01); *G06N 20/00* (2019.01); *G06N 5/01* (2023.01); *G06N 7/01* (2023.01); *G06N 20/10* (2019.01); *G06N 20/20* (2019.01)

(58) Field of Classification Search
USPC .......................................................... 706/12
See application file for complete search history.

(56) References Cited

U.S. PATENT DOCUMENTS

| | | | |
|---|---|---|---|
| 7,734,680 B1 | 6/2010 | Kurapati et al. | |
| 8,018,874 B1 * | 9/2011 | Owechko ............ | H04L 41/0823 370/254 |

(Continued)

OTHER PUBLICATIONS

NPL: Distributed Personalization, hereinafter Chu (Year: 2015).*
Notice of Allowance mailed on May 8, 2019, U.S. Appl. No. 14/864,474, 5 Pages.

*Primary Examiner* — Omar F Fernandez Rivas
*Assistant Examiner* — Em N Trieu
(74) *Attorney, Agent, or Firm* — Nicholson De Vos Webster & Elliott LLP

(57) ABSTRACT

The disclosed embodiments provide a system for performing online hyperparameter tuning in distributed machine learning. During operation, the system uses input data for a first set of versions of a statistical model for a set of entities to calculate a batch of performance metrics for the first set of versions. Next, the system applies an optimization technique to the batch to produce updates to a set of hyperparameters for the statistical model. The system then uses the updates to modulate the execution of a second set of versions of the statistical model for the set of entities. When a new entity is added to the set of entities, the system updates the set of hyperparameters with a new dimension for the new entity.

20 Claims, 5 Drawing Sheets

(51) Int. Cl.
    *G06N 20/10*          (2019.01)
    *G06N 20/20*          (2019.01)

(56)                    References Cited

U.S. PATENT DOCUMENTS

|  |  |  |  |  |
|---|---|---|---|---|
| 9,900,358 | B1 | 2/2018 | Tomkins et al. | |
| 10,402,699 | B1 * | 9/2019 | Chen ..................... | G06N 3/084 |
| 2009/0204461 | A1 * | 8/2009 | Jain ........................ | G06Q 10/06 |
| | | | | 705/7.17 |
| 2012/0195377 | A1 * | 8/2012 | Auyeung ............. | H04N 19/176 |
| | | | | 375/E7.243 |
| 2014/0280251 | A1 | 9/2014 | Somekh et al. | |
| 2015/0242760 | A1 * | 8/2015 | Miao ..................... | H04L 67/306 |
| | | | | 706/12 |
| 2016/0140845 | A1 * | 5/2016 | Agrawal ................ | G08G 1/148 |
| | | | | 340/932.2 |
| 2017/0091652 | A1 * | 3/2017 | Miao ...................... | G06N 20/20 |
| 2017/0209105 | A1 * | 7/2017 | Fan ........................ | A61B 6/544 |
| 2018/0096251 | A1 * | 4/2018 | Dinu ..................... | G06F 3/0482 |

\* cited by examiner

ONLINE HYPERPARAMETER TUNING IN DISTRIBUTED MACHINE LEARNING

CROSS REFERENCE TO RELATED APPLICATIONS

This application is a continuation application of U.S. patent application Ser. No. 15/477,782 filed Apr. 3, 2017, which is hereby incorporated by reference.

The subject matter of this application is related to the subject matter of U.S. patent application Ser. No. 14/864, 474 filed Sep. 24, 2015 and entitled "Version Control for Asynchronous Distributed Machine Learning," which is hereby incorporated by reference.

BACKGROUND

Field

The disclosed embodiments relate to distributed machine learning. More specifically, the disclosed embodiments relate to techniques for performing online hyperparameter tuning in distributed machine learning.

Related Art

Analytics may be used to discover trends, patterns, relationships, and/or other attributes related to large sets of complex, interconnected, and/or multidimensional data. In turn, the discovered information may be used to gain insights and/or guide decisions and/or actions related to the data. For example, business analytics may be used to assess past performance, guide business planning, and/or identify actions that may improve future performance.

However, significant increases in the size of data sets have resulted in difficulties associated with collecting, storing, managing, transferring, sharing, analyzing, and/or visualizing the data in a timely manner. For example, conventional software tools and/or storage mechanisms may be unable to handle the petabytes or exabytes of loosely structured data that is generated on a daily and/or continuous basis from multiple, heterogeneous sources. Instead, management and processing of "big data" may require massively parallel software running on a large number of physical servers and/or nodes, as well as synchronization among the servers and/or nodes.

Consequently, big data analytics may be facilitated by mechanisms for efficiently and/or effectively collecting, storing, managing, compressing, transferring, sharing, analyzing, and/or visualizing large data sets.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
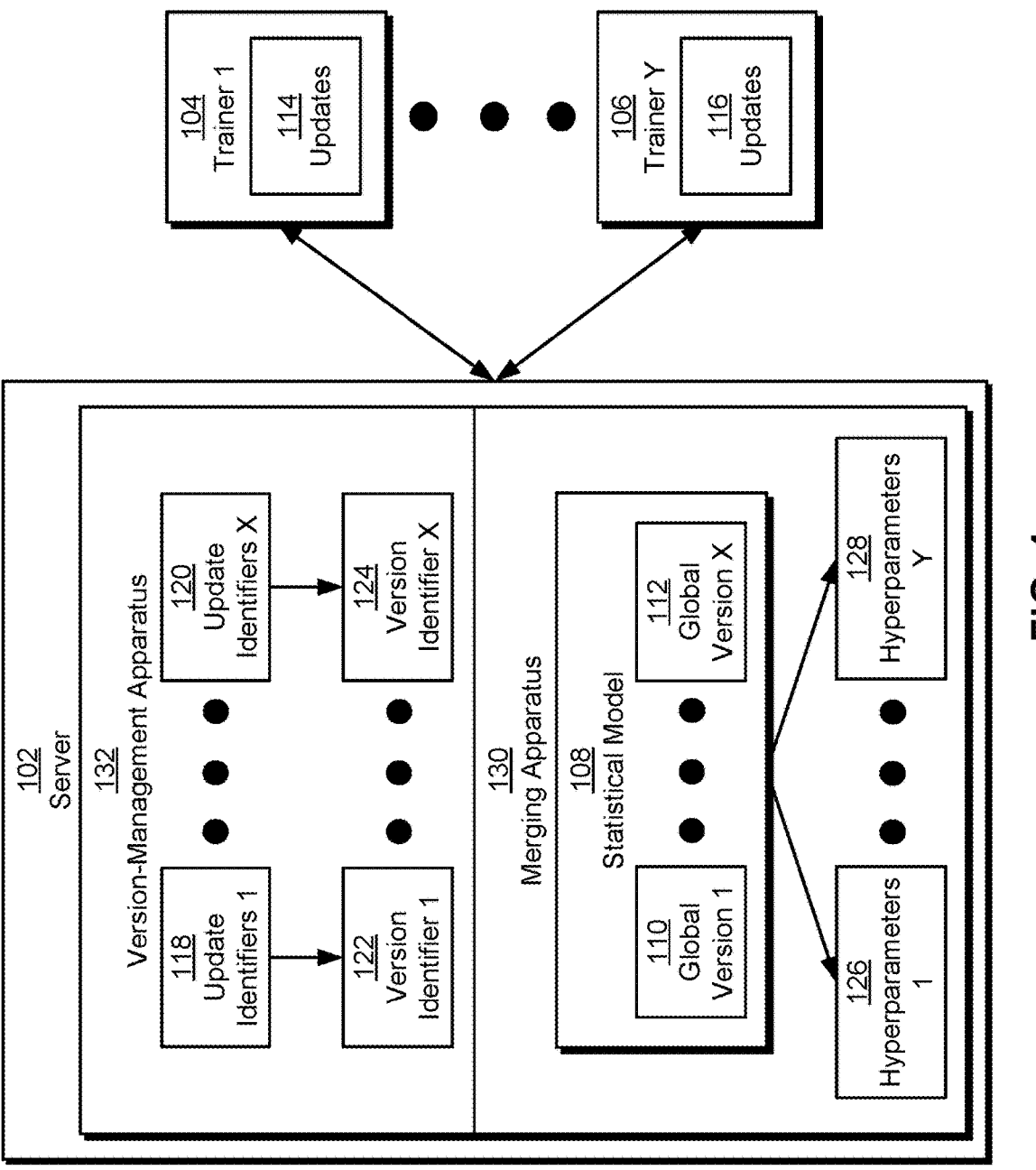
FIG. 1 shows a schematic of a system in accordance with the disclosed embodiments.

The disclosed embodiments provide a method, apparatus, and system for processing data. More specifically, the disclosed embodiments provide a method, apparatus, and system for performing asynchronous distributed machine learning. As shown in FIG. 1, a system for performing the asynchronous distributed machine learning may include a server 102 and a number of trainers (e.g., trainer 1 104, trainer y 106), which interact with one another to produce multiple versions of a statistical model 108. Each of these components is described in further detail below.

Statistical model 108 may be used to perform statistical inference, estimation, classification, clustering, personalization, recommendation, optimization, hypothesis testing, and/or other types of data analysis. For example, statistical model 108 may be a regression model, artificial neural network, support vector machine, decision tree, naïve Bayes classifier, Bayesian network, decision tree, random forest, gradient boosted tree, hierarchical model, and/or ensemble model. The results of such analysis may be used to discover relationships, patterns, and/or trends in the data; gain insights from the input data; and/or guide decisions or actions related to the data. For example, statistical model 108 may be used to analyze input data related to users, organizations, applications, websites, content, and/or other categories. Statistical model 108 may then be used to output scores, provide recommendations, make predictions, manage relationships, and/or personalize user experiences based on the data.

In addition, statistical model 108 may be trained and/or adapted to new data received on the trainers. For example, the trainers may execute on electronic devices (e.g., personal computers, laptop computers, mobile phones, tablet computers, portable media players, digital cameras, etc.) that produce updates 114-116 to statistical model 108 based on user feedback from users of the electronic devices. Alternatively, the trainers may generate updates 114-116 to statistical model 108 in a distributed fashion on different subsets of training and/or input data from server 102 and/or another centralized data source.

Each update may represent a local version of statistical model 108 that is adapted to input data on the corresponding trainer. In addition, the trainers may produce updates 114-116 from global versions (e.g., global version 1 110, global version x 112) of statistical model 108. For example, a trainer may periodically receive a latest global version of statistical model 108 from server 102. The trainer may then generate a local version as an update to the global version by providing user feedback and/or other input data as training data to the global version.

In turn, the trainers may transmit updates 114-116 to server 102, and server 102 may merge updates 114-116 into subsequent global versions of statistical model 108. After a new global version of statistical model 108 is created, server 102 may transmit the new global version to the trainers to propagate updates 114-116 included in the new global version to the trainers. The trainers may then produce additional updates from the new global version and provide the additional updates to server 102 for subsequent generation of additional global versions of statistical model 108.

Thus, statistical model 108 may be iteratively trained through the bidirectional transmission of data from server 102 to the trainers and from the trainers to server 102. Moreover, alternating the creation of global versions of statistical model 108 from input data aggregated from multiple trainers with generation of local versions from the global versions on the trainers may prevent overfitting of statistical model 108 to input data on individual trainers.

In one or more embodiments, local versions of statistical model 108 are produced on the trainers to personalize statistical model 108 to users of the trainers. More specifically, the trainers may obtain a global version of statistical model 108, which tracks the behavior or preferences of all users, from server 102. Each trainer may then update the global version in real-time based on user input or feedback from a user associated with the trainer, thereby creating a user-specific model for the user. For example, the trainer may track and/or receive the user's searches, clicks, likes, dislikes, views, text input, conversions, and/or other implicit or explicit feedback during a user session with a job search tool. As each piece of feedback is received from the user, the trainer may provide the feedback as training data for statistical model 108 to generate one or more updates (e.g., updates 114-116) that customize the output of statistical model 108 to the user's current job search activity. Consequently, the trainer may generate recommendations of job listings based on aggregated training data used to produce the global version, as well as the user's input during the current session with the job search tool.

Alternatively, some or all local versions of statistical model 108 may be personalized to other types of entities.

Continuing with the previous example, local versions of statistical model 108 may also include job-specific models that identify the relevance or attraction of the corresponding job listings to certain user features. Thus, a given job listing may be recommended to a particular user based on a propensity score that combines output from the corresponding job-specific model, the user-specific model for the user, and the global version of statistical model 108.

In one or more embodiments, server 102 and the trainers perform asynchronous distributed machine learning, in which barriers or locks for synchronizing the updating of statistical model 108 are fully removed. For example, server 102 may update statistical model 108 by producing global versions of statistical model 108 and transmitting the global versions to the trainers independently from receiving updates 114-116 to the global versions from the trainers. Since updates to the global versions are not affected by variations in the processing speed, computational power, and/or network delay of individual trainers, statistical model 108 may be updated faster than distributed machine learning techniques that include barriers or locks for synchronizing statistical model updates.

More specifically, the system of FIG. 1 may use automatic version control to perform asynchronous distributed machine learning. As shown in FIG. 1, a version-management apparatus 132 in server 102 may track global versions (e.g., global version 1 110, global version x 112) of statistical model 108 using a set of version identifiers (e.g., version identifier 1 122, version identifier x 124). Each version identifier may represent a given global version of statistical model 108, which is created by a merging apparatus 130 that merges a subset of updates 114-116 from the trainers into one or more previous global versions of statistical model 108.

To track the subset of updates that have been merged into each global version, the corresponding version identifier may be generated from a set of update identifiers (e.g., update identifiers 1 118, update identifiers x 120) for the subset of updates. For example, each update identifier may specify the trainer from which the corresponding update was received, as well as the global version of statistical model 108 used to produce the update. Version-management apparatus 132 may concatenate, hash, and/or otherwise combine update identifiers for a given subset of updates 114-116 into the version identifier for the global version that will be produced from the updates. In turn, merging apparatus 130 may use the version identifiers to ensure that all updates 114-116 from the trainers have been merged into the global versions of statistical model 108 while avoiding merging of each update more than once into the global versions.

By tracking updates 114-116 to statistical model 108 in version identifiers for the global versions, version-management apparatus 132 may allow the global versions to be generated without synchronization barriers associated with updates 114-116. Asynchronous updating of local and global versions of statistical models is described in a non-provisional application by inventors Xu Miao, Yitong Zhou, Joel D. Young, Lijun Tang and Anmol Bhasin, entitled "Version Control for Asynchronous Distributed Machine Learning," having Ser. No. 14/864,474 and filing date 24 Sep. 2015, which is incorporated herein by reference.

In one or more embodiments, merging apparatus 130 includes functionality to perform online tuning of hyperparameters (e.g., hyperparameters 1 126, hyperparameters y 128) for some or all local and/or global versions of statistical model 108. Unlike internal parameters (e.g., coefficients, weights, etc.) used by statistical model 108 to generate scores, classifications, recommendations, estimates, predictions, and/or other inferences or output, the hyperparameters may define "higher-level" properties of statistical model 108.

For example, the hyperparameters may include a regularization parameter that controls the amount of personalization of each local version of statistical model 108. When the regularization parameter is 0, the local version is fully personalized to the corresponding user and does not include any adaptation to the behavior of other users. Thus, a value of 0 for the regularization parameter may result in the creation of a local version of statistical model 108 that is completely separate from any global versions of statistical model 108. As the regularization parameter increases, the personalization of the local version and convergence of statistical model 108 decrease.

In another example, the hyperparameters may include a convergence parameter that adjusts the rate of convergence of global versions of statistical model 108, with a higher value for the convergence parameter resulting in a faster rate of convergence to a less optimal result. Thus, the convergence parameter may be selected to balance the convergence rate and the performance of statistical model 108.

In a third example, the hyperparameters may include a clustering parameter that controls the amount of clustering (e.g., number of clusters) in a clustering technique and/or classification technique that utilizes clusters. In a fourth example, the hyperparameters may specify a feature complexity for features inputted into statistical model 108, such as the number of topics or items in n-grams used during natural language processing. In a fifth example, the hyperparameters may include a model training parameter that controls training of statistical model 108, such as a step size or momentum in a gradient descent technique. In a sixth example, the hyperparameters may include a model selection parameter that specifies the type of statistical model 108 used with the system of FIG. 1. In a seventh example, the hyperparameters may include a decay parameter, such as a parameter for determining an annealing schedule in simulated annealing. In an eighth example, the hyperparameters may include "hyper-hyperparameters," such as starting positions, default values, and/or other parameters related to exploring a search space for other hyperparameters. In a ninth example, the hyperparameters may include a threshold, such as a threshold for removing links with low weights in artificial neural networks.

As discussed in further detail below, such hyperparameter tuning may be performed after a pre-specified amount of user feedback and/or other training data is collected for use in producing updates 114-116 to the corresponding local versions of statistical model 108. Prior to producing an update to a local version, a collected "batch" of input data may be used to calculate a performance metric that reflects the performance of the current version of statistical model 108. Performance metrics related to multiple versions of statistical model 108 may then be provided to merging apparatus 130 and used with an optimization technique to update hyperparameters for various versions of statistical model 108 in a way that improves the performance metrics over time. Consequently, the system of FIG. 1 may provide large-scale personalization and/or recommendation via asynchronous distributed machine learning, as well as online incremental tuning of hyperparameters that further improves the performance of both local and global versions of statistical model 108.

Those skilled in the art will appreciate that the system of FIG. 1 may be implemented in a variety of ways. First, the clients may execute on and/or include different types of software or hardware components. For example, the clients may include web applications, native applications, mobile applications, operating systems, device drivers, and/or other types of software. Similarly, the clients may execute on personal computers, laptop computers, workstations, portable electronic devices, and/or other types of network-enabled computing devices.

Second, one or more instances of server 102 may be used to aggregate updates 114-116 from the clients into global versions of statistical model 108. If multiple instances of server 102 exist, each instance may be matched to a different subset of clients based on attributes of the instance and the clients. For example, the network bandwidth, processor resources, and/or memory on a given instance of server 102 may be matched to a client based on the rate at which the client generates updates to statistical model 108, the importance of the client, the revenue associated with the client, and/or other metrics or characteristics associated with the client. Different global versions of statistical model 108 produced by the instances may then be merged into a master global version through additional communication among the server 102 instances.

Moreover, individual instances of server 102 may be used to perform different types of training and/or updating related to statistical model 108. For example, different instances of server 102 may be used to perform updating of hyperparameters and/or global versions of statistical model 108 for different applications (e.g., job recommendations, skill recommendations, ad recommendations, propensity scores, reputation scores, connection strengths, etc.).

Figure 2:
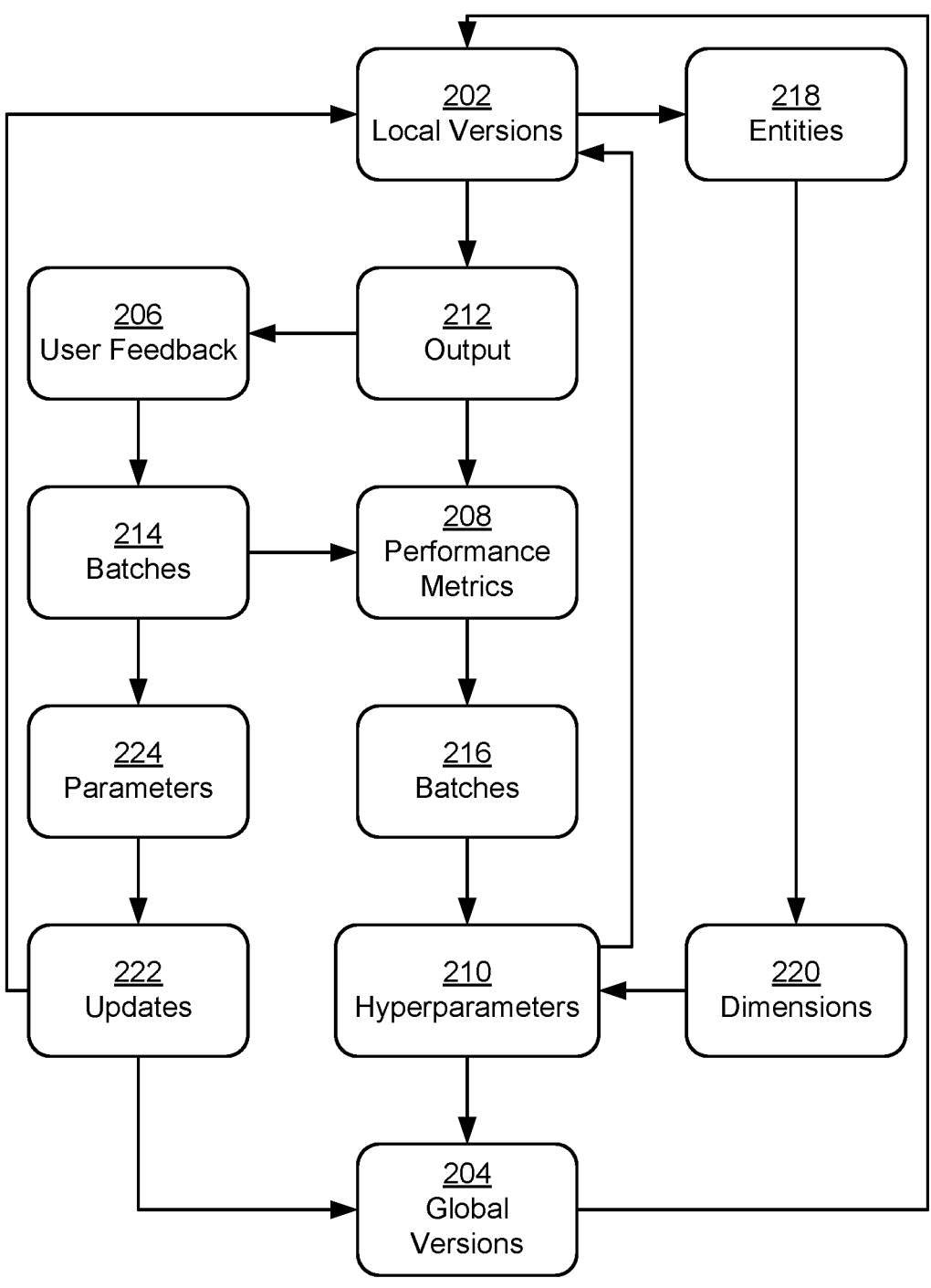
FIG. 2 shows the online tuning of hyperparameters in distributed machine learning in accordance with the disclosed embodiments.

FIG. 2 shows the online tuning of hyperparameters 210 in distributed machine learning in accordance with the disclosed embodiments. As mentioned above, hyperparameters 210 may define properties of a statistical model, such as statistical model 108 of FIG. 1. For example, hyperparameters 210 may control regularization, convergence, clustering, feature complexity, model training, model selection, decay, thresholds, and/or optimization of other aspects of the statistical model.

In addition, the statistical model may have multiple local versions 202 and one or more global versions 204. Individual local versions 202 may be personalized to specific users, recommendations, job listings, advertisements, content items, and/or other types of entities 218. Output 212 from each local version may be displayed and/or otherwise presented to one or more users, and user feedback 206 and/or other input data related to output 212 may be collected and/or tracked. For example, a local version of the statistical model may be loaded during a user session with an online professional network. The local version may include one or more updates 222 to the statistical model that were generated based on historic and/or prior user feedback 206 from the user. Alternatively, the local version may be copied from the most recent global version of the statistical model, if input data related to the corresponding entity is lacking and/or a previous local version for the entity has been replaced by the global version.

Continuing with the previous example, the local version may output predictions, scores, and/or inferences related to job listings, advertisements, articles, potential connections, and/or other content shown within the online professional network during the user session. In turn, output 212 from the local version may be used to select a subset of the content as recommendations (e.g., job recommendations, connection recommendations within a "People You May Know" feature, content items within a "news feed," advertisements, etc.) for display to the user during the user session. Output 212 may also, or instead, be provided to the user via channels outside the user session (e.g., email, text message, etc.) and/or used to modulate other types of interaction with the user.

User feedback 206 related to output 212 may additionally be collected during the user session as clicks, views, searches, likes, dislikes, comments, shares, applications to job listings, and/or other interaction with the online professional network. Each piece of user feedback 206 may be included in training data that is applied to parameters 224 of the local version to generate an update (e.g., updates 222) to the local version. Consequently, the output of the local version may be adapted to the user's real-time behavior or preferences during the user session.

In one or more embodiments, updates 222 are made to local versions 202 of the statistical model by training local versions 202 on individual batches 214 containing pre-specified amounts of user feedback 206 and/or other input data associated with the corresponding entities. For example, each piece of user feedback 206 collected in response to output 212 may be classified as a positive response (e.g., a click, like, positive comment, share, upvote, follow, etc.) or a negative response (e.g., a view, dislike, downvote, negative comment, hide, unfollow, etc.). A batch of user feedback 206 may be defined as a pre-specified number of negative responses (e.g., 100) and/or any number of negative responses plus a positive response from a given user and/or for a given entity. After enough user feedback 206 is collected to form a batch for a given local version of the statistical model, the batch (e.g., batches 214) may be provided as additional training data that is used to generate an update to parameters 224 (e.g., regression coefficients, neural network weights, etc.) of the local version.

Updates 222 to parameters 224 of multiple local versions 202 of the statistical model may periodically be merged into a new global version of the statistical model. For example, each update to a local version of the statistical model may be transmitted by a trainer to a server, such as server 102 of FIG. 1. The server may use version control to merge the updates into a new global version of the statistical model asynchronously from receiving the updates from the trainers, as discussed in the above-referenced application. The server may then transmit the new global version to the trainers for subsequent adaptation of the global version into personalized versions based on user feedback 206 collected during individual user sessions with a set of users. Thus, the statistical model may be continuously updated through the creation of local versions 202 of the statistical model from global versions of the statistical model by the trainers and the subsequent merging of the personalized versions into new global versions of the statistical model by the server.

As shown in FIG. 2, batches 214 of user feedback 206 may also be used to calculate performance metrics 208 for the corresponding local versions 202. More specifically, each batch of user feedback 206 may be used as input data to a corresponding local version of the statistical model prior to using the batch to update the local version. Output 212 generated by the local version in response to the input data and labels (e.g., outcomes) associated with the input data may then be used to calculate a receiver operating characteristic (ROC) area under the curve (AUC) as a performance metric for the local version.

In one or more embodiments, the contribution of output 212 to a performance metric for a local version is discounted based on the age of the corresponding batches 214 of user feedback 206 used to produce output 212. Continuing with the previous example, the performance metric may be calculated as a weighted average of ROC AUC values for the local version, with each ROC AUC value calculated by the local version from a different batch of user feedback 206. Within the weighted average, each AUC value may be multiplied by a weight that decreases as the age of the batch of user feedback 206 from which the AUC value is calculated increases. For example, each historic batch may have a weight that decays or discounts by 0.95 every time a new batch is received and/or a weight that decays with time in seconds or minutes. To reduce noise and/or unnecessary computation associated with the performance metric, a batch of user feedback 206 may be removed from the calculation of the performance metric once the weight drops below an eviction threshold. Each ROC AUC value may also, or instead, be calculated using individual data points that are discounted by time.

After an updated performance metric is calculated for a local version of the statistical model (e.g., using a batch of recently received user feedback 206 and/or batches 214 of historic user feedback 206 related to the local version), the corresponding client and/or trainer task may transmit the performance metric to the server. In turn, the server may incrementally update hyperparameters 210 using batches 216 of performance metrics 208, with each batch containing a pre-specified number of performance metrics generated from multiple batches 214 of user feedback 206 for various local versions 202 of the statistical model. For example, an update to hyperparameters 210 may be made after 100 performance metrics 208 are collected from various local versions 202 of the statistical model.

More specifically, an optimization technique such as particle swarm optimization may be applied to a given batch of performance metrics 208 to explore the search space for hyperparameters 210. The particle swarm optimization may utilize a set of "particles" to explore the search space; within the search space, each particle may have a position representing a different set of values for hyperparameters 210 (i.e., a candidate solution for the optimization technique), as well as a velocity that is used to iteratively update the particle's position. The position and/or velocity may be initially randomized and/or set to a default value. Attributes of the particles (e.g., number of particles, particle momentum, initial positions and velocities, etc.) may be specified by one or more "hyper-hyperparameters," which may be fixed or tuned separately.

Entities 218 for which hyperparameters 210 are tuned may be represented as dimensions 220 in the search space of hyperparameters 210. For example, the particle swarm optimization technique may model the search space with a different dimension for each entity for which a local or personalized version of the statistical model is generated. When a new entity (e.g., user, content item, job listing, advertisement, recommendation, etc.) is created or added for use with the statistical model, a new dimension representing the entity may be added to the search space for hyperparameters 210, and all particles in the search space may be updated with default and/or randomized positions and velocities within the new dimension.

After a batch of performance metrics 208 is received by the server, the server may use the batch to update the particles' positions and/or velocities so that each particle is deflected toward the current global best position for the entire set of particles, as well as the individual particle's historic best position in the search space. Continuing with the previous example, each particle may include a position represented by an n-dimensional vector for "n" different entities. Each element in the vector may store a regularization parameter value ranging from 0 to 1 to customize the level of personalization of the statistical model to the corresponding entity. Thus, a user, job listing, advertisement, and/or other entity with features that are relatively distinct from other entities 218 may have a regularization parameter that is closer to 0 to increase the level of personalization associated with the corresponding local version. On the other hand, an entity with characteristics that overlap significantly with those of other entities 218 may have a regularization parameter that is closer to 1 to mitigate overfitting of the statistical model to the entity.

When a new entity is created or introduced for personalization by the statistical model, a separate regularization parameter value for the entity may be tracked by adding a new element or "dimension" representing the entity to all vectors representing the positions of particles in the particle swarm optimization. The new element may initially be set to a default position and velocity of 0 for all particles. Alternatively, the position and velocity of the new element may be set to randomized values and/or the position and velocity of the previous best-performing version of statistical model 108. To enable subsequent optimization of the regularization parameter value for the entity, the position and velocity along that dimension may subsequently be randomized and/or updated according to the positions, velocities, and/or performance metrics 208 associated with the particles in the search space.

When a batch of user feedback 206 is received for a given entity, the corresponding trainer may calculate multiple performance metrics 208 for the local version associated with the entity using the batch, with each performance metric calculated using a hyperparameter value from a different particle in the particle swarm optimization. Continuing with the previous example, the trainer may obtain all current particle positions in the hyperparameter search space from the server and obtain a set of regularization parameter values for the entity from the dimension representing the entity in the particles. The trainer may use the local version, the most recent global version of the statistical model, the batch of user feedback 206, and the regularization parameter values to calculate a set of performance metrics 208 as a set of ROC AUCs for the entity across all particle positions. More specifically, a regularization parameter value from each particle position may be used to produce an overall output from the statistical model for the entity as a weighted combination of the output of the local version and the output of the global version. The overall output may then be compared with outcomes associated with the corresponding input data (e.g., user feedback 206) to calculate a true positive rate and a false positive rate for each batch of input data for the entity. In turn, the true positive and false positive rates for multiple batches 214 of input data may be used to produce a set of ROC AUCs that are averaged or otherwise aggregated to generate a single performance metric for the entity and particle position. During aggregation of the ROC AUCs, each ROC AUC may also be weighted so that ROC AUCs from older batches 214 of user feedback 206 are discounted according to the age of each batch, as described above.

After performance metrics 208 for all particles are calculated from a batch of user feedback 206 for a given entity, the trainer may transmit the calculated performance metrics 208 to the server. The server may then aggregate performance metrics for all entities from all trainers into an average performance metric across all entities for each particle position. As with the calculation of per-entity performance metrics 208, the average performance metric for each particle may optionally include time-based discounting of performance metrics 208.

Finally, after the server has received enough performance metrics 208 to form a batch (e.g., after new performance metrics 208 are received for 100 entities), the server may update the average performance metrics with the performance metrics and use the average performance metrics to update the positions and velocities of the particles. As mentioned above, the particle swarm optimization technique may update the positions and velocities of the particles in the search space for hyperparameters 210 so that each particle is guided towards the position with the best performance in the entire swarm, as well as the particle's historic best-performing position. The best-performing version of the statistical model may also be used to populate an updated set of parameters 224 and/or hyperparameters 210 for local versions 202 and/or global versions 204 of the statistical model. For example, a vector of values representing the position may be transmitted as regularization parameter values for all entities 218 to execution engines for the statistical model, and the execution engines may use the transmitted values to tune the level of personalization of the statistical model to each entity. The server and/or execution engines may also optionally replace parameters 224 of a subset of local versions 202 and/or global versions 204 with performance metrics 208 that fall below a threshold with parameters 224 of higher-performing versions of the statistical model.

After the average performance metrics have been updated with a batch of performance metrics 208, the server may optionally replace the positions of a subset of "underperforming" particles (i.e., particles with positions that produce low performance metrics 208) with the positions and/or velocities of one or more of the highest performing particles (e.g., particle positions that produce the highest performance metrics 208). The new positions of the particles may represent new hyperparameters 210 that are applied to local and/or global versions of the statistical model. In turn, the new hyperparameters 210 may be used to evaluate the performance of the new positions during subsequent updating of hyperparameters 210 and/or various versions of the statistical model. Consequently, hyperparameters 210 may iteratively be improved using batches 216 of performance metrics 208 for multiple versions of the statistical model, which in turn are calculated from batches 214 of user feedback 206 and/or other input data as the input data is received.

Those skilled in the art will appreciate that hyperparameters 210 may be updated in other ways. For example, batches 216 of performance metrics 208 may be used with grid search, Bayesian optimization, gradient-based optimization, meta-optimization technique, and/or another optimization technique. In another example, the dimensionality of the search space for hyperparameters 210 may be reduced by clustering entities with similar features and tuning hyperparameter values for each cluster of entities instead of for individual entities. A separate global version may also be developed for each cluster to improve personalization for entities in the cluster while enabling training of the global version from the larger data set for the cluster.

Figure 3:
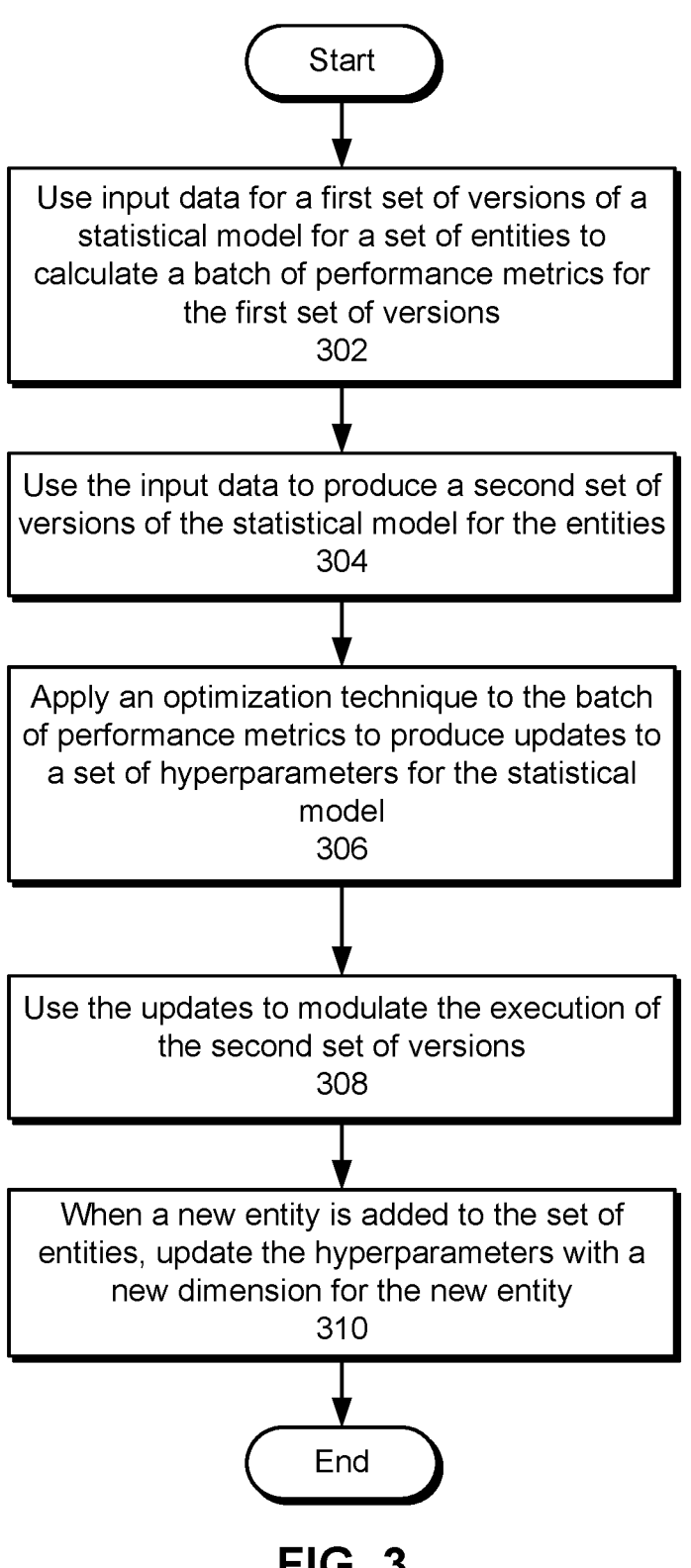
FIG. 3 shows a flowchart illustrating a process of performing online hyperparameter tuning in distributed machine learning in accordance with the disclosed embodiments.

FIG. 3 shows a flowchart illustrating a process of performing online hyperparameter tuning in distributed machine learning in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, input data for a set of versions of a statistical model for a set of entities is used to calculate a batch of performance metrics for the versions (operation 302). For example, a performance metric for each version may be calculated as an aggregate ROC AUC that is based on the true positive and false positive rates associated with a set of outputs generated by the version from a set of input data, as well as labels (e.g., outcomes) associated with the input data. The performance metric may be calculated after a pre-specified amount of input data is received for the corresponding entity (e.g., as user feedback and/or another stream of data associated with the entity). The ROC AUC may also be calculated in a way that discounts contributions of the outputs to the ROC AUC based on the age of the input data used to produce the outputs (e.g., by multiplying each historic "batch" of input data by a discount factor every time a new batch is received). A pre-specified number of performance metrics calculated for various versions of the statistical model may then be aggregated into a batch.

Next, the input data is used to produce a second set of versions of the statistical model for the entities (operation 304). For example, after a pre-specified amount of input data is received for a given entity, the pre-specified amount is used as training data to produce an update to a local version of the statistical model for the entity. The updated local version and updates to other local versions of the statistical model for other entities may then be merged into a global version of the statistical model, asynchronously from generating the updates to the local versions.

An optimization technique is then applied to the batch of performance metrics to produce updates to a set of hyperparameters for the statistical model (operation 306), as described in further detail below with respect to FIG. 4. The hyperparameters may include a regularization parameter, clustering parameter, convergence parameter, feature complexity, model training parameter, model selection parameter, decay parameter, threshold, and/or hyper-hyperparameter.

The updates are also used to modulate execution of the second set of versions (operation 308). For example, a regularization parameter may be used to customize the level of personalization associated with each local version of the statistical model, while a convergence parameter may adjust the rate of convergence of global versions of the statistical model.

When a new entity is added to the set of entities, the hyperparameters are updated with a new dimension for the new entity (operation 310). For example, a vector of hyperparameter values may be updated with a new element representing the entity, which is initialized with a default value. During subsequent updating of the hyperparameters using the optimization technique, the element may be randomized to allow the performance of the default value to be compared with the randomized value. In turn, the performance comparison may facilitate subsequent optimization of the element's value with other hyperparameter values in the search space (e.g., using subsequent batches of performance metrics). Alternatively, the element may be initialized with a random value and subsequently updated using a velocity that is also randomized with respect to the new dimension.

Figure 4:
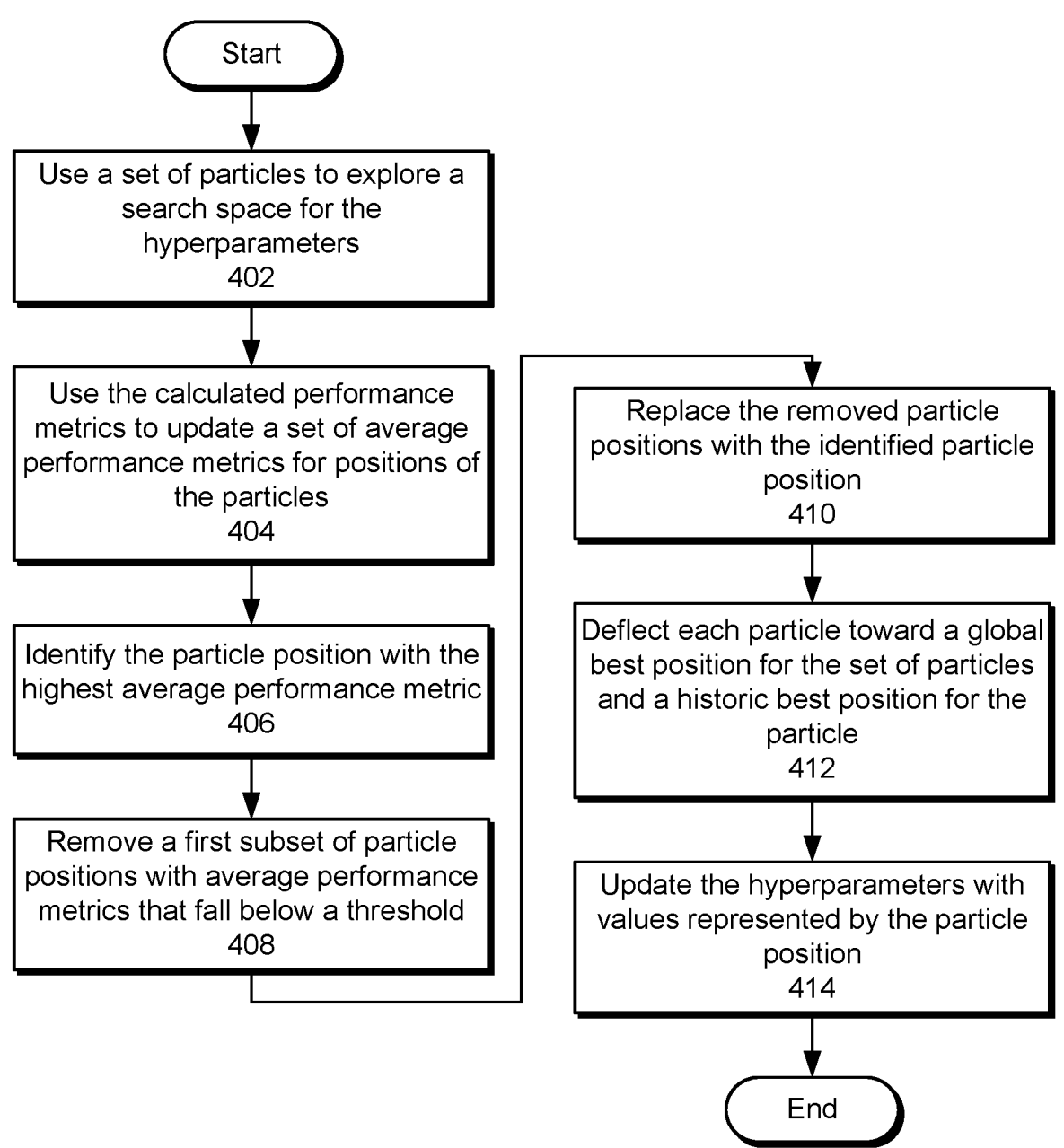
FIG. 4 shows a flowchart illustrating a process of updating a set of hyperparameters for a statistical model in accordance with the disclosed embodiments.

FIG. 4 shows a flowchart illustrating a process of updating a set of hyperparameters for a statistical model in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a set of particles is used to explore a search space for the hyperparameters (operation 402). Each particle may have a position and a velocity in the search space, with the coordinates of the position representing a candidate solution for optimizing the hyperparameters and the velocity used to iteratively update the position. In addition, each dimension in the position may represent a different entity for which a hyperparameter value is to be optimized, as discussed above.

Next, the calculated performance metrics are used to update a set of average performance metrics for positions of the particles (operation 404). The calculated performance metrics may be produced from batches of input data to multiple versions of the statistical model, such as local and/or global versions of the statistical model. In turn, the calculated performance metrics may be incorporated into a running "average" performance metric across all entities (e.g., as represented by different versions of the statistical model) for each particle. The running average may be calculated from current and historic batches of input data for each entity, with older batches optionally discounted by the age of the batch. In turn, the updated average performance metrics are used to identify the particle position with the highest average performance metric (operation 406).

The average performance metrics are also used to update positions and velocities of the particles in the search space. More specifically, a first subset of particle positions with average performance metrics that fall below a threshold is removed (operation 408) from the search space. The first subset may include particle positions with average performance metrics that do not meet a numeric threshold and/or a pre-specified number of particles or percentage of all particles with the lowest average performance metrics. The removed particle positions are also replaced with the identified particle position (e.g., the particle position with the highest average performance metric) (operation 412). One or more particle positions may also, or instead, be replaced with random values and/or using the positions of other high-performing particles in the search space. Each particle is then deflected toward a global best position for the set of particles and a historic best position for the particle (operation 412).

Finally, the hyperparameters are updated with values represented by the particle position (operation 414). For example, the hyperparameters may be updated with coordinate values from the particle's position in the search space. The updated hyperparameters may then be used to modulate subsequent execution of the corresponding versions of the statistical model, as discussed above.

Figure 5:
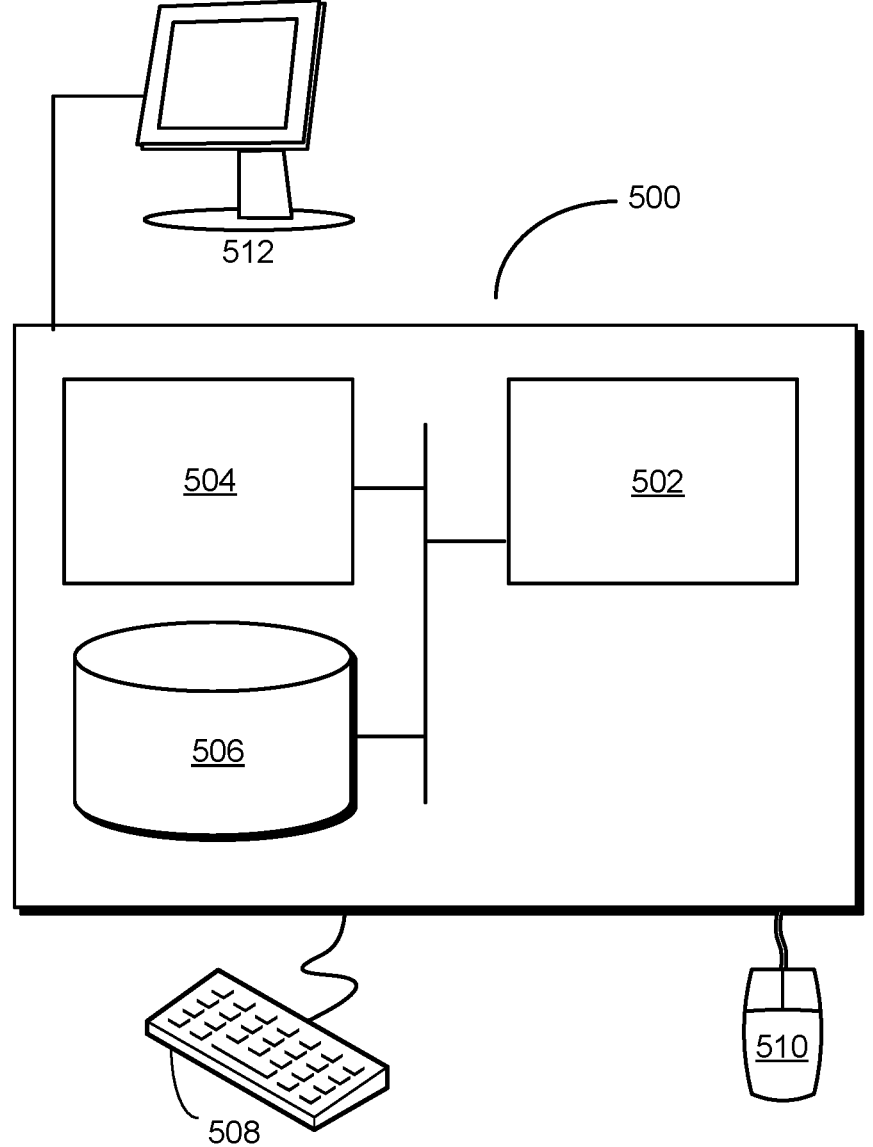
FIG. 5 shows a computer system in accordance with the disclosed embodiments.

FIG. 5 shows a computer system 500. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for performing online tuning of hyperparameters in distributed machine learning. The system may include a training apparatus and a merging apparatus, one or both of which may alternatively be termed or implemented as a module, mechanism, or other type of system component. The merging apparatus may use input data for a first set of versions of a statistical model for a set of entities to calculate a batch of performance metrics for the first set of versions. Next, the merging apparatus may apply an optimization technique to the batch to produce updates to a set of hyperparameters for the statistical model. When a new entity is added to the set of entities, the merging apparatus may update the set of hyperparameters with a new dimension for the new entity. The training apparatus may use the input data to produce the second set of versions of the statistical model and use the updates to modulate the execution of the second set of versions.

In addition, one or more components of computer system 500 may be remotely located and connected to the other components over a network. Portions of the present embodiments (e.g., server, trainers, version-management apparatus, merging apparatus, local versions, global versions, personalized versions, etc.) may also be located on different nodes of a distributed system that implements the embodiments. For example, the present embodiments may be implemented using a cloud computing system that performs asynchronous distributed machine learning and/or online hyperparameter tuning for multiple remote versions of a statistical model.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

The invention claimed is:

1. A method, comprising:
    sending a first version of a global statistical model, including hyperparameter values and values of other parameters that are not hyperparameters, to a plurality of local model trainers that are each configured to train a local version of the global statistical model;
    wherein the hyperparameter values include regularization values that are each associated with one of the local versions of the global statistical model and correspond to a level of tuning for a respective entity of a plurality of different entities, wherein the regularization values are associated with an amount of personalization associated with the respective entity, and wherein a regularization value is used to produce an overall output as a weighted combination of an output of the local version of the global statistical model and an output of the global statistical model;
    receiving, from the plurality of local model trainers, a plurality of local model performance metrics that correspond to user feedback on outputs produced by the local versions of the global statistical model;
    updating the hyperparameter values including the regularization values based on the received plurality of local model performance metrics;
    including the updated hyperparameter values in a second version of the global statistical model; and sending the second version of the global statistical model, including the updated hyperparameter values, to the plurality of local model trainers;
    wherein the updated hyperparameter values include updated regularization values that each correspond to a change in the level of tuning for the respective entity.

2. The method of claim 1, further comprising aggregating the plurality of local model performance metrics into an average performance metric across the plurality of different entities, and updating the hyperparameter values based on the average performance metric.

3. The method of claim 2, further comprising applying a time-based discounting function to the average performance metric, and updating the hyperparameter values based on the time-based discounted average performance metric.

4. The method of claim 1, further comprising creating a batch of performance metrics in response to receiving local model performance metrics for a threshold number of the plurality of different entities, and using the batch of performance metrics to update the hyperparameter values.

5. The method of claim 4, further comprising using an optimization technique to update the hyperparameter values based on the batch of performance metrics.

6. The method of claim 5, further comprising using a particle swarm optimization technique to optimize the hyperparameter values across the plurality of different entities for which the local versions of the global statistical model are tuned.

7. The method of claim 6, further comprising representing the plurality of different entities for which the local versions of the global statistical model are tuned as different dimensions in a search space.

8. The method of claim 7, further comprising, adding a new entity to the plurality of different entities for which the local versions of the global statistical model are tuned; and adding a new dimension representing the new entity to the search space.

9. The method of claim 1, wherein the plurality of local model trainers are each configured to train a local version of the global statistical model for a specific entity selected from a group comprising specific users, specific types of recommendations, specific job listings, specific advertisements, and specific digital content items.

10. The method of claim 1, further comprising:
    receiving, from the plurality of local model trainers, updated values of the other parameters that are not hyperparameters;
    including the received updated values of the other parameters that are not hyperparameters in the second version of the global statistical model; and
    sending the second version of the global statistical model, including the updated values of the other parameters that are not hyperparameters, to the plurality of local model trainers.

11. A method, comprising:
    receiving, from a statistical model merging apparatus, a first version of a global statistical model, including hyperparameter values and values of other parameters that are not hyperparameters;
    wherein the hyperparameter values include regularization values that are each associated with one of the local versions of the global statistical model and correspond to a level of tuning for a respective entity of a plurality of different entities, wherein the regularization values are associated with an amount of personalization associated with the respective entity, and wherein a regularization value is used to produce an overall output as a weighted combination of an output of the local version of the global statistical model and an output of the global statistical model;

creating the local version of the global statistical model by tuning the first version of the global statistical model for the specific entity;

sending, to the statistical model merging apparatus, a plurality of local model performance metrics that correspond to user feedback on outputs produced by the local version of the global statistical model; and receiving, from the statistical model merging apparatus, a second version of the global statistical model, including updated hyperparameter values;

wherein the updated hyperparameter values include an updated regularization value that corresponds to a change in the level of tuning for the specific entity.

12. The method of claim 11, further comprising:

responsive to receiving a pre-specified amount of the user feedback, computing the plurality of local model performance metrics.

13. The method of claim 12, wherein computing the plurality of local model performance metrics includes calculating a receiver operating characteristic (ROC) area under the curve (AUC) value using the outputs produced by the local version of the global statistical model.

14. The method of claim 13, wherein computing the plurality of local model performance metrics includes discounting user feedback based on an age of the user feedback.

15. The method of claim 11, further comprising:

responsive to receiving a pre-specified amount of negative user feedback, updating the other parameters of the local version of the statistical model.

16. The method of claim 15, further comprising:

sending the updated other parameters to the statistical model merging apparatus.

17. The method of claim 11, wherein tuning the first version of the global statistical model for the specific entity comprises personalizing the first version of the global statistical model for a specific user of an online system.

18. The method of claim 11, wherein tuning the first version of the global statistical model for the specific entity comprises tuning the first version of the global statistical model for a specific type of recommendation or a specific content type.

19. A method, comprising:

sending, by a statistical model merging apparatus, a first version of a global statistical model, to a plurality of local model trainers that are each configured to train a local version of the global statistical model for a different respective entity;

receiving, by a local model trainer of the plurality of local model trainers, from the statistical model merging apparatus, a regularization value that is associated with a local version of the global statistical model and corresponds to a level of tuning for a specific entity wherein the regularization values are associated with an amount of personalization associated with the respective entity, and wherein a regularization value is used to produce an overall output as a weighted combination of an output of the local version of the global statistical model and an output of the global statistical model;

creating, by the local model trainer, the local version of the global statistical model by tuning the first version of the global statistical model for the specific entity;

receiving, by the local model trainer, user feedback responsive to output of the local version of the global statistical model;

computing, by the local model trainer, a plurality of local model performance metrics based on the received user feedback;

sending, by the local model trainer, to the statistical model merging apparatus, the plurality of local model performance metrics;

updating, by the statistical model merging apparatus, the regularization value based on the plurality of local model performance metrics;

including, by the statistical model merging apparatus, the updated regularization value in a second version of the global statistical model; and sending, by the statistical model merging apparatus, the second version of the global statistical model, including the updated regularization value, to the local model trainer;

wherein the updated regularization value corresponds to a change in the level of tuning for the specific entity.

20. The method of claim 19, wherein:

computing, by the local model trainer, the plurality of local model performance metrics includes calculating a receiver operating characteristic (ROC) area under the curve (AUC) value using the output of the local version of the global statistical model; and updating, by the statistical model merging apparatus, the regularization value includes using a particle swarm optimization technique to optimize the regularization value.

* * * * *